G. H. SPAULDING,
Assignor to R. H. JONES.
Harvester.
No. 8,703. Reissued May 6, 1879.
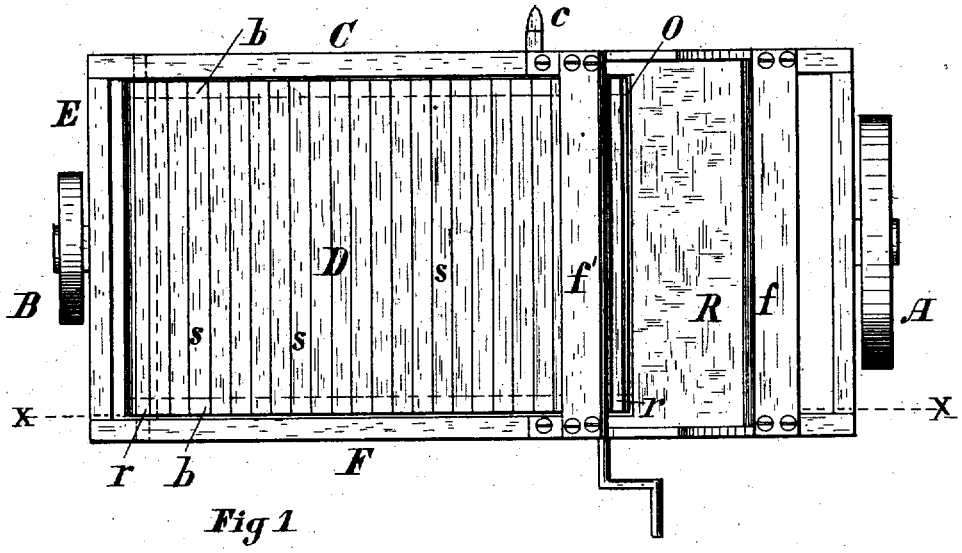
Fig 1
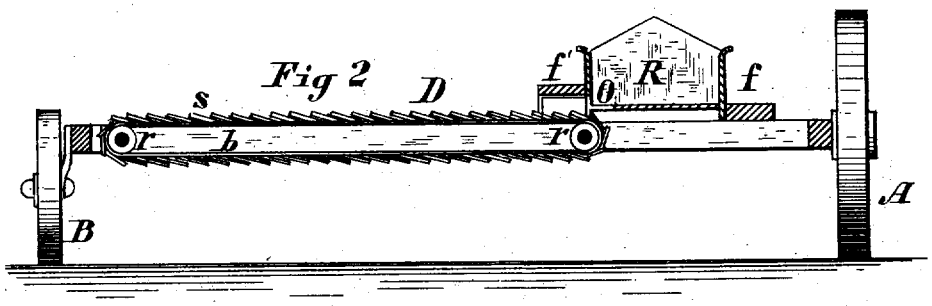
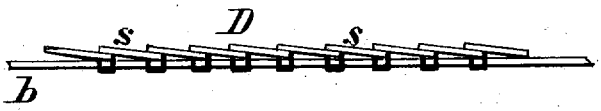
Fig 3
Witnesses;
W. C. Carlis
D. J. May.
INVENTOR
George H. Spaulding.
By Coburn & Bachus
Attorneys.
N. PETERS, PHOTO-LITHOGRAPHER, WASHINGTON, D. C.

UNITED STATES PATENT OFFICE.

GEORGE H. SPAULDING, OF ROCKFORD, ILLINOIS, ASSIGNOR TO RICHARD H. JONES.

IMPROVEMENT IN HARVESTERS.

Specification forming part of Letters Patent No. 72,238, dated December 17, 1867; Reissue No. 8,703, dated May 6, 1879; application filed October 17, 1878.

*To all whom it may concern:*

Be it known that I, GEORGE H. SPAULDING, of Rockford, in the county of Winnebago and State of Illinois, have invented a certain new and useful Improvement in Harvesters, which is fully set forth in the following specification, reference being had to the accompanying drawings, in which—

Figure 1 represents a plan view of a harvester embodying my improvements; Fig. 2, a transverse section of the same, taken on the line X X, Fig. 1; and Fig. 3, a detail section on an enlarged scale, showing the arrangement of the metallic strips composing the apron.

My invention relates to that class of harvesting-machines in which the grain is bound by attendants riding on the machine.

The invention consists in a grain-receiver constructed to permit the grain to be delivered into it at its bottom instead of the top thereof, as heretofore.

It also consists in a grain-receiver provided with a delivery-opening at its bottom, in combination with mechanism whereby the grain is discharged into the receiver through the bottom opening.

It also consists in special devices, and special arrangements and combinations of devices, all of which will be hereinafter more fully set forth in the description, and specified in the claims.

In the drawings, A represents the main or driving wheel, and B the grain-wheel, which supports the outer end of the finger-bar C, which latter is shown in the drawings provided with the first guard-finger *c* at its inner end. A receptacle or receiver, R, for the grain is placed in the platform between the driving-wheel A and the finger-guard *c*. On each side of this box R are two foot-boards, *f f'*, on which the binders stand when binding.

The platform-frame E F of the harvester is of ordinary construction, and is provided with two rollers, *r r*, around which is stretched an endless apron, D. As shown in the drawings, this apron is composed of metallic strips or battens *s*, which are secured to belts *b b*, passing around the rollers *r*.

The outer foot-board, *f'*, is raised enough to admit the grain passing under it into the box R through the opening O in the lower part of the latter. The action of the strips *s* in this operation is more positive than the mere bearing or transporting of the grain, for these strips, being flat and secured pliantly by their forward edges—that is, the edges which are nearest the box R when the said strips are on top of the platform—pass along by the revolving of the rollers, which are connected with the driving-wheel for this object, and bear the grain upon their upper surfaces, as is usual with battens ordinarily attached; but these strips or battens, being secured at their forward edges, rise more or less in a vertical position as they pass over the rollers at each end of the platform, and this elevation of them as they pass under the opening O in the box R thrusts the grain into the said box, thus keeping it crowded compactly to the side opposite the opening O, and by this action raises the grain in the box to make room for that which follows, as each successive strip delivers its portion into the box. Thus the box is filled from the bottom instead of the top, as in other harvesters, and the binders work upon the grain in the box without the hinderance of removing the bundle elsewhere to lock the band.

The manner in which this machine operates and is attended is thus: The machine being drawn forward, the driving-wheel communicates motion to the rollers *r r*, which carry the apron along with the grain that has fallen upon it, the apron being behind the cutter-bar C, the sickle of which is also in motion. The grain is carried under the foot-board *f'*, and the strips *s*, by rising, pass very close to the bottom board or metallic sheet of the box R, and thus the grain is thrust upon this bottom board, and the succeeding grain, being delivered in a like manner, crowds or pushes against that preceding it, thus filling the box.

The binders, standing at the sides of the box R, and having their feet on the foot-boards *f f'*, stoop down, bind the bundles, and throw them off on the ground.

If there is more grain in the box than sufficient to make a bundle, the requisite quantity only need be taken from the top without scattering and wasting the grain in transferring it to a binding-platform, as in other machines, for the band is locked while the bundle is in the box, and when completed it is then thrown out.

The advantages of these improvements are simplicity, ease of repair, and cheapness of construction. Further, the grain is bound in the box and not wasted by moving it about. It also obviates the employment of side-stage binding-tables and elevating-aprons, and consequently is cheaper and easier of draft.

Having thus described my invention, what I claim as new, and desire to secure by Letters Patent, is—

1. In a harvester, a grain-receptacle constructed and adapted to receive the grain at the bottom thereof, substantially as described.

2. In a harvester, a grain-receiver provided with an opening at its bottom, in combination with delivery mechanism adapted to discharge the grain into the receiver through the opening at the bottom thereof, substantially as described.

3. A bottom-delivery grain-receiver, R, in combination with an endless delivering-apron, D, arranged to force the grain into the receiver through the bottom opening thereof, substantially as described.

4. A grain-receiver, R, in combination with the foot-boards *f f'*, arranged one on each side of the receiver, substantially as described.

5. The foot-board *f'* on the platform side of the receiver, raised to permit the grain to pass beneath it, substantially as described.

6. The endless apron or carrier D, composed of the belts *b* and metallic strips secured to the belts at their forward edges only, substantially as described.

GEORGE H. SPAULDING.

Witnesses:
JNO. C. MACGREGOR,
W. C. CORLIES.